Feb. 11, 1930.  R. REITERER ET AL  1,746,741
PHOTOGRAPHIC FILM CAMERA
Filed April 9, 1927

Inventors
R. Reiterer and
J. C. Hofmann
By: Marks & Clerk
Attys.

Patented Feb. 11, 1930

1,746,741

UNITED STATES PATENT OFFICE

RUDOLF REITERER AND JULIUS CARL HOFMANN, OF VIENNA, AUSTRIA

PHOTOGRAPHIC FILM CAMERA

Application filed April 9, 1927, Serial No. 182,441, and in Austria April 12, 1926.

This invention relates to an improved photographic film-camera for taking correct photographs, particularly for the direct production of positives or diapositives, in which the image is reflected by means of a mirror onto a sensitized film, and in which the image is focussed upon a ground glass screen, disposed behind the said mirror.

According to the present invention, the camera is so constructed that the exposure is made on a roll-film by reflection from an opaque mirror which is adapted to be moved from an inoperative position in front of the film to an operative position at an angle of 45°, means being provided whereby, when the mirror is moved into the exposure position, a focal plane shutter in front of the film is automatically released, and whereby, when the mirror returns to its inoperative position after an exposure, the advancement of the film is automatically effected.

During an exposure, the opaque mirror in conjunction with a frame upon which it rests, prevents light from reaching the sensitized surface through the ground glass screen or focussing plate, while in the closed position of the mirror, the ground glass screen or focussing plate, in the rear wall of the camera, is free for the focussing operation.

One mode of carrying out the present invention is illustrated by way of example on the accompanying sheet of drawing in which:—

Figure 1:
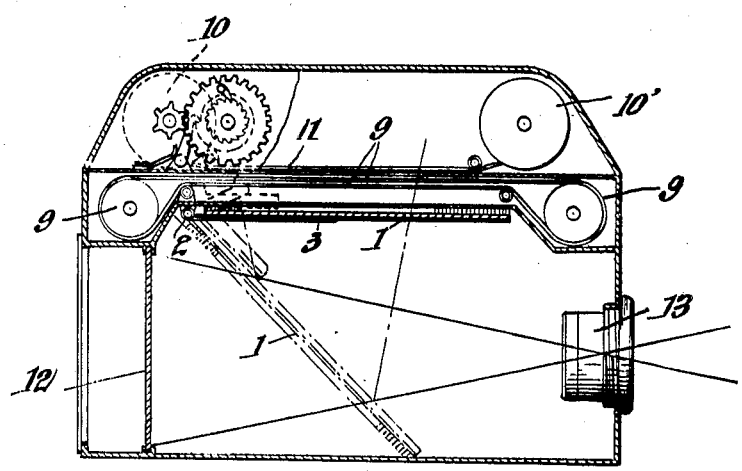
Fig. 1 shows in sectional elevation the camera.
Figures 2, 3:
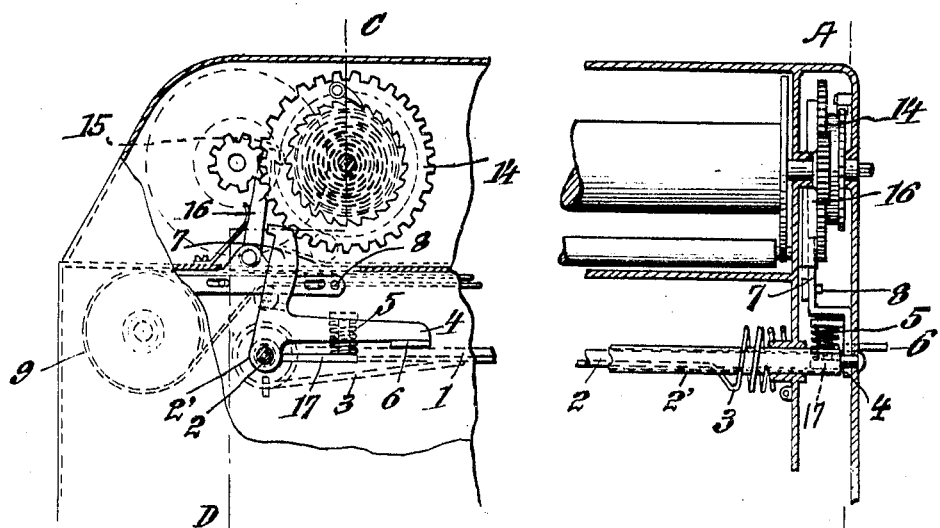
Figs. 2 and 3 illustrate the feed-device on an enlarged scale and in transverse section and longitudinal section respectively.

The mirror 1 is rotatable about a shaft 2 and is maintained in the closed position illustrated in Fig. 1 by a spring 3, which is attached to the said shaft. A double-armed lever 4, 7 is mounted on the shaft 2, and a spring 5 is interposed between the arm 4 of the said lever and an arm 17, secured to the sleeve 2' of the shaft 2. By means of an outwardly extending grip 6 of the lever, the mirror 1 is opened against the action of the spring 3. The spring 5 is stronger than the spring 3, so that the spring first mentioned is not compressed when moving the mirror into the open position shown in dash-dotted lines in Fig. 1. As soon as the mirror 1 rests on the floor of the camera-box and on continuing the pressure upon the grip 6, the spring 5 is compressed and the other arm 7 of the double-armed lever cooperates with the escapement pin 8 of the slotted shutter 9 and thus operates the latter. Now the film 11 is exposed which passes over the rollers 10 and 10'.

After releasing the grip 6, the mirror 1 jumps back into its initial position, closes the opening of the film-compartment and now the image produced by the lens 13 is again visible on the ground glass 12.

The following arrangement serves for feeding the film-roll after exposure has taken place. The film-roll 10 is subjected to the action of a watch-spring, which is disposed in a casing 14. The latter is provided with a tooth 15, which is engaged by a locking member 16, and thus the casing is secured against rotation. When shutting the mirror 1 by releasing the grip 6, the arm 7 of the double-armed lever jumps back beyond its position of rest and strikes against the locking member 16, whereby the tooth 15 is released for a moment and the film-roll 10 is fed forward in consequence of the action of the watch-spring.

We claim:—

A photographic film camera comprising a casing, a roll film compartment in the upper part of said casing, a focal plane shutter in front of the film in said compartment, a hinged opaque mirror adapted to be moved from an inoperative position in front of the film into an operative position at an angle of 45°, a focussing screen at the rear of the casing, and means whereby the focal plane shutter is automatically released when the mirror is moved into the exposure position and whereby the film is automatically advanced when the mirror returns to its inoperative position.

In testimony whereof we have affixed our signatures.

REITERER, RUDOLF.
JULIUS CARL HOFMANN.